UNITED STATES PATENT OFFICE.

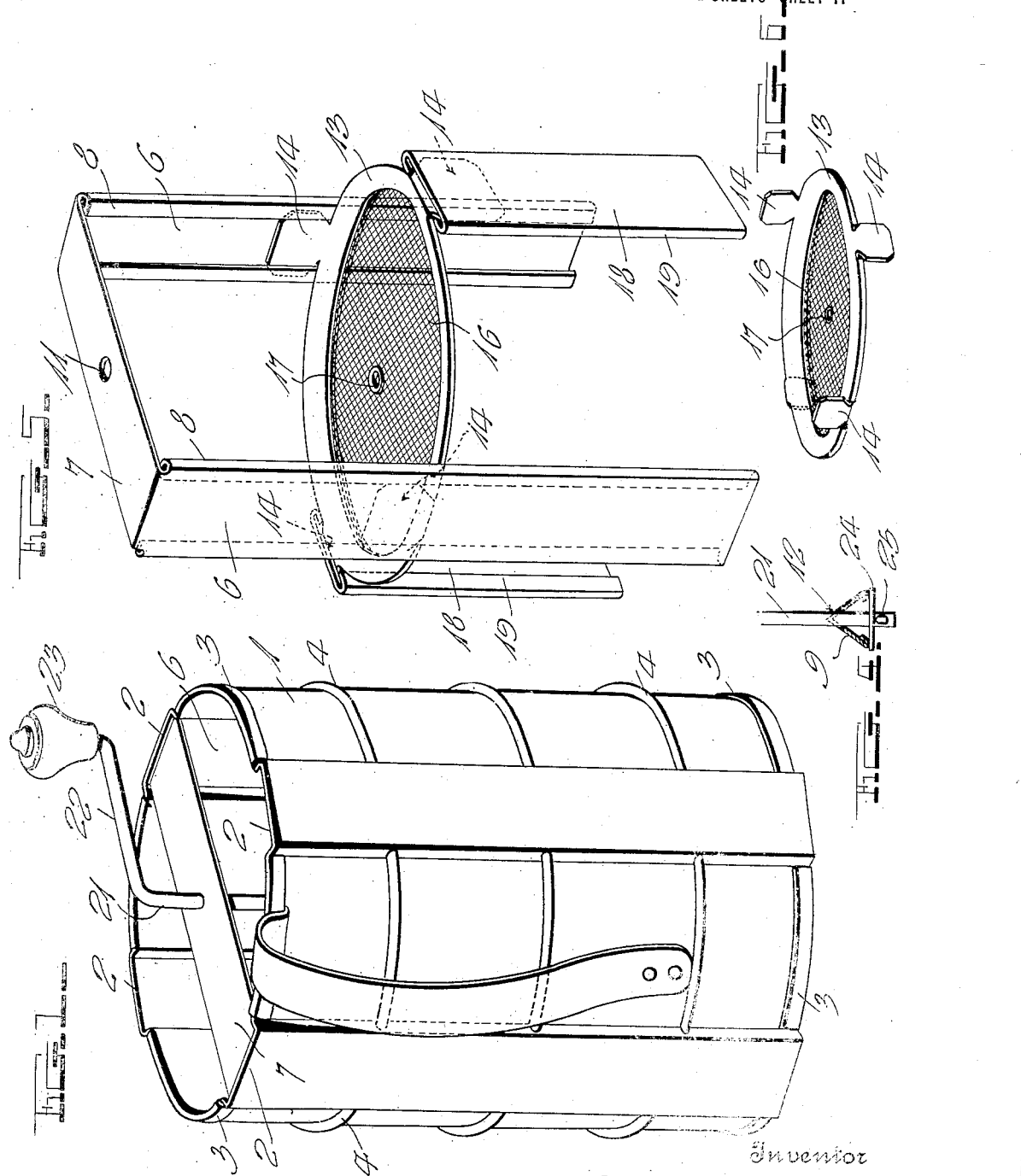

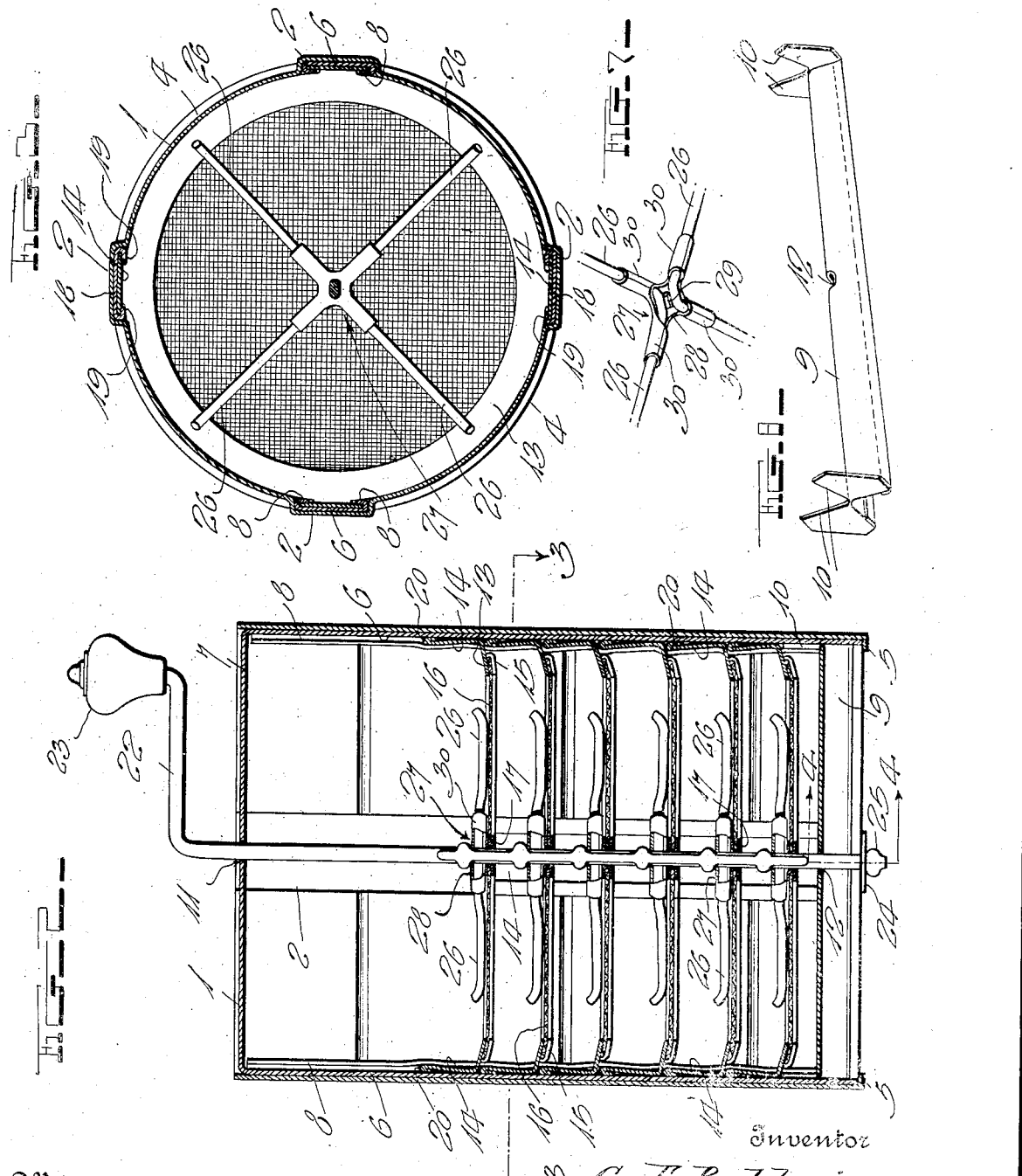

CHARLES E. BALDWIN, OF OCONTO, WISCONSIN, ASSIGNOR OF ONE-FOURTH TO IRVING BREAKSTONE, OF OCONTO, WISCONSIN.

FLOUR-SIFTER.

1,358,920.  Specification of Letters Patent.  Patented Nov. 16, 1920.

Application filed August 19, 1920. Serial No. 404,503.

*To all whom it may concern:*

Be it known that I, CHARLES E. BALDWIN, a citizen of the United States, residing at Oconto, in the county of Oconto and State of Wisconsin, have invented certain new and useful Improvements in Flour-Sifters; and I do declare the following to be a full, clear, and exact description of the invention, such as will enable others skilled in the art to which it appertains to make and use the same.

This invention relates generally to kitchen utensils, but particularly to flour sifters.

The principal object of the invention is to provide a flour sifter which will effectively sift flour at a single operation, the sifter being provided with a plurality of sifting screens and agitators therefor so that the flour will be sifted successively through the various screens.

Another object of the invention is to provide a flour sifter in which the screens and agitators are removable as a unit from the casing or container of the sifter, thereby permitting the various parts of the device to be easily cleaned.

A further object of the invention is to provide a flour sifter in which a plurality of screens and agitators are removable from the casing or vessel of the device as a unit, and the screens and agitators being separable so that any part of the device may be repaired or replaced by a new part should that become necessary.

A still further object of the invention is to provide a flour sifter of this character, the majority of the parts of which are formed of sheet metal, the device being comparatively simple, strong, durable and inexpensive in construction, efficient and reliable in operation, and adapted to the purpose for which it is designed. With these and other incidental objects in view, the invention consists of the novel features of construction, and the combination and arrangement of parts as are hereinafter fully described and claimed.

The descriptive matter of the specification is supplemented by the accompanying drawings in which similar numerals are used to designate like parts throughout the several views.

In these drawings:—

Figure 1 is a perspective view of a complete flour sifter constructed in accordance with the invention;

Fig. 2 is a central vertical sectional view of the sifter;

Fig. 3 is a transverse sectional view thereof taken substantially on the plane indicated by the line 3—3 of Fig. 2;

Fig. 4 is a detail vertical sectional view of a portion of the sifter taken substantially on the plane indicated by the line 4—4 of Fig. 2;

Fig. 5 is a perspective view of a portion of the screen and agitator unit;

Fig. 6 is a similar view of one of the screens or sieves;

Fig. 7 is a perspective view of one of the clamps which is used to hold the agitator arms upon the operating shaft; and Fig. 8 is a perspective view of the lower horizontal member of the screen and agitator frame.

In the embodiment illustrated the numeral 1 designates a casing or vessel which is of cylindrical shape and which is provided with two pairs of oppositely disposed vertically extending grooves 2 on its inner side, said grooves 2 being formed by stamping the material of the vessel so that the outer side thereof has vertically extending ridges. The upper and lower edges of the vessel 1 between the grooves 2 are doubled upon themselves as at 3 for the purpose of strengthening the vessel. As a further means of strengthening vessel 1 its wall between adjacent grooves 2 is pressed outwardly at a number of equidistant points between its upper and lower edges to form horizontal ridges 4. The vessel 1 is open at both the top and bottom. The outer walls of the grooves 2 at their lower ends are provided with inwardly extending ledges 5, the purpose of which is hereinafter described.

Fitted within the vessel 1 is a frame which carries a plurality of screens or sieves and coöperating agitators. This frame and the attached sieves and agitators are removable as a unit from the vessel 1. The frame is substantially rectangular in configuration and comprises a pair of upright members or bars 6 integrally united at their upper end by means of a horizontal cross-bar 7. The side or longitudinal edges of the bars 6 are turned inwardly as at 8 so as to provide their inner sides with undercut channels. To the lower ends of the bars 6 is connected a horizontal cross-bar 9. This cross-bar 9 is of inverted V-shape in cross section and has its longitudinal edges doubled upon themselves for the purpose of strengthening the bar. The ends of the bar 9 are provided with upwardly extending wings 10, which fit in the channels formed of the inturned edges 8 of the bars 6. The upper cross-bar 7 is provided at a point midway its ends with an aperture 11, while the lower cross-bar 9 is similarly provided with an aperture 12.

The rectangular frame carries a number of sieves composed of rings or rims 13 provided with two pairs of oppositely disposed and vertically extending wings 14. Clamped to the lower sides of the wings 13 in any suitable manner but preferably by flanges 15 are screens 16, the central portions of which are provided with eyelets 17. One of the pairs of the wings 14 extend upwardly from the rims 13 for disposal in the channels formed by the inturned edges 8 of the bars 6, while the other pairs of the wings 14 extend downwardly from the rims 13 and are received in the undercut channels formed at the inner side of supplemental bars 18. The channels in the bars 18 are formed by bending their side or longitudinal edges inwardly as at 19. The bars 18 are considerably shorter than the bars 6.

After the various sieves have been slid in place in the channels of the bars 6 and in the channels of the bars 18, the inturned edges 8 and 19 of the bars 6 and 18 respectively are pressed tightly against the wings 14 and the sieves are thereby locked more or less rigidly in place. The vertically extending wings 14 of one sieve abuts the rim 13 of the adjacent sieve so that by this means the sieves are maintained in equally spaced relation. If desired, the wings 14 may have their outer edges doubled upon themselves as indicated at 20 for the purpose of strengthening said wings.

Extending through the apertures 11 and 12 in the cross-bars 7 and 9 respectively and through the eyelets 17 in the sieves is a shaft 21, the upper end of which is bent at right angles and provided at its extremity with an operating knob 23 while the lower end of the shaft 21 extends through a washer 24 and is then upset or swaged as at 25 to prevent it from becoming disengaged from the washer. The washer 24 extends across the space between the lower edges of the bar 9 and forms a projection at this point so that the shaft 21 is thereby prevented from vertical movement.

The shaft 21 carries a number of agitators, one of which is disposed above each of the sieves. These agitators are formed of pairs of substantially V-shape pieces of wire 26 connected at their intermediate portions to the shaft 21 by means of clamps 27. The clamps 27 consist of plates 28 provided with apertures 29 for receiving the shaft 21 and arms 30 which are bent around the arms of the wires 26. The larger portion of the shaft 21 is flat on opposite sides, and the apertures 29 are provided with flat opposite edges so that by this means the agitators are prevented from turning upon the shaft 21. The agitators are disposed upon the shaft 21 so that they are in close proximity to the sieves and after the desired adjustment has been made the portions of the shaft 21 are upset or swaged so as to maintain this adjustment.

In assembling the device the sieves are first connected in succession to the bars 18 and then they are slid into the channels formed by the inturned edges 8 of the bars 6. The agitators are then placed above the sieves and the shaft 21 is inserted through the opening 11 in the upper cross-bar 7, through the openings in the agitators and sieves and through the opening 12 in the cross-bar 9. The washer 24 is then placed upon the lower end of the shaft 21 and the shaft is then upset at the portion 25. The agitators are then pressed more or less tightly against the sieves and the shaft 21 is swaged at portions adjacent the clamps 27 of the agitators. The unit formed by the frame, sieves and agitators is then placed in the receptacle or vessel 1, the bars 6 being slid into two of the oppositely disposed grooves 2, while the bars 18 are slid into the other two oppositely disposed grooves 2. The ends of the bars 6 and 18 are rested upon the aforementioned ledges or projections 5 arranged at the lower ends of the grooves 2.

In operating the device flour is poured into the upper end of the vessel 1 and the shaft 21 is turned by means of a knob 23. Flour will thereby be sifted successively through the various sieves and will pass out of the lower end of the vessel in a finely divided state. In view of the fact that it undergoes a number of sifting operations, it will not have to be passed through the sifter a second time to prepare it for use as is the case with the usual type of flour sifter. The cross-bar 9 being of the inverted V-shape formation in a cross section forms no place for any flour to lodge after being sifted but the flour after being sifted will pass unobstructed through the lower end of the vessel 1.

Whenever it is desired to clean the device, the frame carrying the sieve and agitators can be removed as a unit from the vessel 1 so that all portions of both the vessel and the frame carrying the sieve and agitators can be reached. Should any of the parts of the device become broken and either needs repairing or to be replaced by new parts, the same can be readily done as all of the parts of the device can be separated.

From the foregoing description, taken in connection with the accompanying drawings, it will be seen that the objects of the invention have been effectively carried out. It is apparent that minor details of construction, and in the proportion and arrangement of parts may be modified without departing from the spirit and principle of the invention, and such changes are permitted within the scope of the pending claims.

I claim:

1. A flour sifter comprising a vessel open at the top and bottom and provided on its interior with a pair of vertically extending grooves, an open rectangular frame slidable vertically in said grooves and removable from said vessel, a plurality of superimposed sieves provided at their edges with upright wings disposed flat against the upright portions of said frame and fastened thereto, agitators disposed adjacent said sieves, and an upright shaft extending through said frame and through said sieves and carrying said agitators, said shaft being provided with means by which it may be manually rotated.

2. A flour sifter comprising a vessel open at the top and bottom and provided on its interior with a pair of oppositely disposed vertically extending grooves, an open rectangular frame having upright bars slidable vertically in said grooves and removable from said vessel, the said bars being provided on their inner sides with longitudinal extending undercut channels, a plurality of superimposed sieves provided at their edges with upright wings disposed and frictionally maintained in said channels, agitators disposed adjacent said sieves, and a shaft extending vertically through said frame and through said sieves and said agitators and carrying said agitators, said shaft being provided with means whereby it may be manually rotated.

3. A flour sifter comprising a vessel open at the top and bottom and provided on its inner side with a pair of oppositely disposed vertically extending grooves, an open rectangular frame having oppositely disposed vertical bars slidably received in said grooves, the longitudinal edges of said bars being bent inwardly upon themselves to form vertically extending undercut channels at the inner sides of said bars, sieves provided at their edges with upright wings received in said channels and frictionally engaged by the inturned edges of said upright bars, agitators disposed adjacent said sieves, and a shaft extending vertically through said frame and through said sieves and carrying said agitators, said shaft being provided with means whereby it may be manually rotated.

4. A flour sifter comprising a vessel open at the top and bottom and provided with two pairs of oppositely disposed vertically extending grooves on its inner side, an open rectangular frame having oppositely disposed vertical bars slidably received in a pair of said oppositely disposed grooves, another pair of oppositely disposed vertical bars slidably received in the other pair of oppositely disposed grooves, sieves provided at their rims with upright wings attached to said bars, agitators disposed adjacent said sieves, and a shaft extending vertically through said frame and through said sieves and carrying said agitators, said shaft being provided with means whereby it may be manually rotated.

5. A flour sifter comprising a vessel open at the top and bottom and provided on its inner side with two pairs of oppositely disposed vertically extending grooves, an open rectangular frame having oppositely disposed vertically extending bars slidably received in a pair of said oppositely disposed grooves, an additional pair of oppositely disposed vertically extending bars slidably received in the other pair of oppositely disposed grooves, the longitudinal edges of said bars being bent inwardly upon themselves to provide undercut channels on their inner sides, sieves provided at their rims with upright wings disposed in said channels and frictionally engaged by said inturned edges of said bars, agitators disposed adjacent said sieves, and a shaft extending vertically through said frame and through said sieves and carrying said agitators, said shaft being provided with means whereby it may be manually rotated.

6. A flour sifter comprising a vessel open at the top and bottom and provided on its inner side with a pair of vertically extending oppositely disposed grooves, an open rectangular frame having vertical side bars slidably received in said grooves, the lower cross-bar of said frame being of inverted V-shape in cross section, a plurality of superimposed sieves secured at their rims to said side-bars, agitators disposed adjacent said sieves, and a shaft extending vertically through said frame and said sieves and carrying said agitators, said shaft being provided with means whereby it may be manually rotated.

7. A flour sifter comprising a vessel open at the top and bottom and provided on its inner side with a pair of oppositely disposed vertically extending grooves, an open rectangular frame provided with vertically extending bars slidably received in said grooves, an upper cross-bar integrally uniting the upper ends of said vertical bars, a lower cross-bar having its ends secured to the lower ends of said vertical bars, said lower cross-bar being of inverted V-shape in cross section, a plurality of superimposed sieves secured at their rims of said vertical bars, agitators disposed adjacent said sieves, and a shaft extending through said frame and through said sieves and carrying said agitators, said shaft being provided with means whereby it may be manually rotated.

8. A flour sifter comprising a vessel, a sieve mounted in said vessel, a shaft mounted in said vessel, a clamp carried by said shaft adjacent said sieve, said clamp consisting of a plate containing an aperture through which said shaft extends and four radial arms, and a pair of V-shaped members having their intermediate portions disposed adjacent a pair of adjacent arms and the latter being bent there-around to clamp said members thereto, the arms of said members operating across said sieve.

In testimony whereof I have hereunto set my hand.

CHARLES E. BALDWIN.